United States Patent [19]

André

[11] Patent Number: 4,641,849
[45] Date of Patent: Feb. 10, 1987

[54] MANUAL ACTUATING DEVICE, ESPECIALLY FOR STEERING A MOTORCYCLE

[75] Inventor: De Cortanze André, St. Cloud, France

[73] Assignee: Elf France, Paris, France

[21] Appl. No.: 742,578

[22] Filed: Jun. 7, 1985

[30] Foreign Application Priority Data

Jun. 14, 1984 [FR] France .................. 84 09321

[51] Int. Cl.[4] .................................. B62K 11/14
[52] U.S. Cl. ...................... 280/270; 180/219; 280/778
[58] Field of Search ............... 280/270, 271, 272, 274, 280/281 LP, 774, 778, 263; 180/219

[56] References Cited

U.S. PATENT DOCUMENTS

| 496,388 | 5/1893 | Adams | 280/272 |
|---|---|---|---|
| 2,576,413 | 11/1951 | Padjen | 280/274 |
| 2,618,447 | 11/1952 | Lecarme | 280/778 |
| 3,429,584 | 2/1969 | Hendricks | 280/281 LP |
| 3,521,904 | 7/1970 | Sheffer | 280/270 |
| 4,239,248 | 12/1980 | Ewers | 280/270 |
| 4,293,052 | 10/1981 | Daswick | 180/219 |

Primary Examiner—John J. Love
Assistant Examiner—Charles R. Watts
Attorney, Agent, or Firm—Burgess, Ryan & Wayne

[57] ABSTRACT

A manual actuating device for a motorcycle steering that allows the motorcyclist to push and pull right and left handles to affect turning of the motorcycle. Each handle is connected through a three bar set to a rotatable connecting bar which is integral with a return lever which is pivotally attached to a steering rod.

3 Claims, 1 Drawing Figure

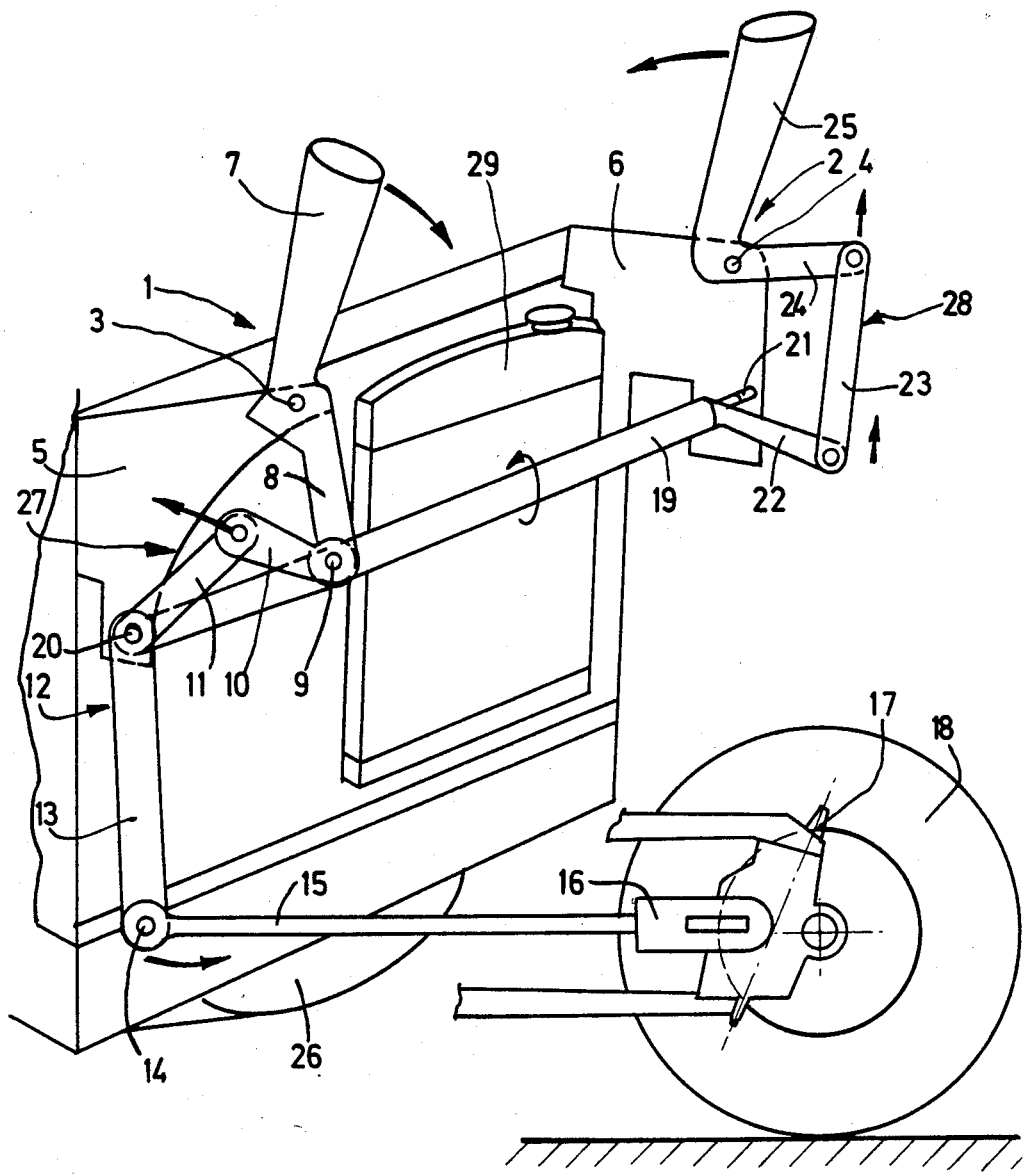

MANUAL ACTUATING DEVICE, ESPECIALLY FOR STEERING A MOTORCYCLE

FIELD OF THE INVENTION

The present invention concerns a manual device for actuating, through the intermediary of two handles, the orientation of the directing or steering wheels of a vehicle, acting upon a directing rod.

BACKGROUND OF THE INVENTION

Vehicles, such as motorcycles, comprise a directing member known as a "handle-bar" which is constituted by a transversal tube integral with a vertical directing rod connected to the wheel fork of the front wheel of the motorcycle. The transversal tube is terminated, at each end, by handles or grips that are used for the manual orientation of the steering and upon which can be fixed other means for controlling the vehicle, such as brake and clutch handles.

This device, which is equally suitable for both relatively slow cycles and motorcycles has proved to be, on the contrary, impractical and above all only slightly ergonomic with respect to rapid motorcycles that are liable to assume sharp angles of tilt or roll on cornering. To do this it would appear advantageous to be able to tilt the guiding handles in the same direction as the tilting or banking direction of the vehicle.

SUMMARY OF THE INVENTION

One of the aims of the present invention is specifically to design a manual actuating device for a motorcycle steering that allows the motorcyclist to tilt the guiding levers or handles in the banking or tilting direction of the vehicle when cornering.

With this purpose, the manual actuating device of a steering rod controls the guiding wheels of a vehicle through the intermediary of two handles that are rotatably movable in a substantially vertical plane and each connected to three bars, the first bars of these bar sets forming with each of the handles a lever hinged on the vehicle, the third bar being integral with a connecting bar intended to turn around its longitudinal axis, transversal to the longitudinal axis of the vehicle, and integral with a second element constituted by a return arm connected at least in rotation with the above-mentioned connecting bar and connected to the steering rod, wherein a second bar of one three bar set forms a first angle with the first bar and a second angle with the third bar, wherein one of the first and second angles is greater than 180 degrees and wherein a second bar from a second three bar set forms a third angle with the first bar and a fourth angle with the third bar, wherein both the third and fourth angles are less than 180 degrees, wherein the return arm and the third bar of one of the sets of bars form a lever that is connected at least in rotation with the rotary connecting bar.

When the actuating device according to the invention is applied to the direction control of a motorcycle, each of the handles is respectively fixed to the right side and the left side of the upper part of the engine-transmission block of the motorcycle in order to form, with the three corresponding bars, a lever-block and the connecting bar connects the two lever-blocks above the engine-transmission block, while the return bar is disposed on the side of the engine-transmission block in order to be connected by its lower portion to the steering rod, so as to leave a free space at the front of the engine-transmission block in which to house an auxiliary member such as a cooling radiator.

In the steering actuating device according to the invention applied to a vehicle such as a motorcycle liable to tilt or bank on cornering towards the inside of the bend, the connection between the two handles and the connecting bar, on the one hand, and the connection between the steering rod and a steering front wheel bracket, on the other hand, are achieved so that on cornering the handle located on the internal side of the bend is turned to thrust position towards the front of the vehicle whereas the other handle is turned to retracted position towards the rear according to the ergonomic effect that it is sought to obtain.

BRIEF DESCRIPTION OF THE DRAWINGS

Other aims, advantages and features of the present invention will become apparent from reading the following description of an embodiment of the device according to the invention, given by way of non-limitative example with reference to the appended drawing in which the single FIGURE is a schematic perspective view of a manual actuating device for a motorcycle steering according to the invention.

DETAILED DESCRIPTION OF THE DRAWING

The direction actuating device represented in the FIGURE comprises two rotary levers 1 and 2 hinged by axles 3 and 4 on brackets 5 and 6 of the vehicle. Lever 1 presents a substantially vertical upper arm forming handle 7 and a lower arm following the first bar 8 disposed substantially in the alignment of handle 7. The end of bar 8 opposite hinging axle 3 is hinged through a pin 9 to a push-rod or second bar 10, itself hinged at its end to a short arm 11 of a return lever 12, a long arm 13 of which is downwardly oriented and hinged at 14 at its lower end to a steering rod 15 connected to the bracket 16 of a steering pivot 17 of the front wheel 18 of the motorcycle.

Return lever 12 is solidly connected by any means such as welding or interlocking to a connecting bar 19 mounted rotary-wise transversally to the longitudinal direction of the vehicle and supported by bearings 20 and 21 of brackets 5 and 6. Short arm 11 forming the third bar is thus rendered integral at least in rotation with the rotary connecting bar 19 that is connected at least in rotation with another third bar 22 constituted by a rotary arm with the connecting bar 19.

The third bar 22 is connected by another second bar or push-rod 23 to another first bar 24 forming the bent arm for the lever 2 that presents another arm in the form of a handle arm 25 directed upwards. It will be noted that the second bar 10 of the lever block associated with lever 1 is intersected by the first bar 8 and the third bar 11; i.e. it does not contain the sides of a parallelogram with these bars whereas the second bar 23 of the lever block associated to the lever 2 does not intersect the first bar 24 and the third bar 22 with which it contains the sides of the parallelogram. This general disposition, due partially to the fact that the first bar 24 is a bent arm of the lever 2, means that the rotation of the connecting bar 19 provokes counter-direction rotations on handles 7 and 25.

The operation of the steering device will now be described. The motorcycle rider grasps firmly in each hand a different handle 7 or 25 of the direction control and in order to guide the front wheel 18 of the motorcycle in a right-handed bend, for example, he exerts either a push on handle 7, or a pull on handle 25, or simultaneously reverse rotation moments on these two handles, so as to provoke the rotation of the connecting bar 19 and of the return lever 12, the long arm 13 of which thus pushes towards the right-hand side of the figure steering rod 15, which causes to turn support 16 and wheel 18 about steering pivot 17. These directions of motion are indicated on the figure by arrows applied to the main hinging points.

Whatever the action exerted, the rotation of the front wheel 18 on its pivot 17 is always apparent from a rotation of handles 7 and 25 in opposite directions, thereby allowing the motorcyclist to occupy an improved control position of his motorcycle during cornering. In order to cause to turn front wheel 18 in the counter direction, the motorcyclist reverses the rotation directions of the handles 7 and 25 that remain mechanically connected to each other by connecting bar 19.

It will be noted from the figure that each of handles 7 and 25 and their corresponding connecting bars can be respectively fixed on the right and left hand-sides of the upper portion of an engine-transmission block 26 through the intermediary of brackets 5 and 6 to form, with the three corresponding bars 8, 10, 11 or respectively 24, 23, 22 a lever block 27 and 28. The connecting bar 19 connects the two lever-blocks 27 and 28 above the engine-transmission block 26 and the long arm 13 of the return lever 12 is placed on the side of the engine-transmission block 26 so as to be connected in the lower portion at 14 to steering rod 15. This disposition thus releases the frontal portion of the engine-transmission block 26 and allows, for example, to easily house a cooling radiator 29 in front of the engine-transmission block behind the front wheel 18.

The long arm 13 of return lever 12 can, of course, be rendered directly integral with connecting bar 19 at least in rotation whereas the third bar 11 independent from lever 12 (which is thus suppressed) is rendered integral at least in rotation with the connecting bar 19.

I claim:

1. A manual actuating device of a steering rod which controls at least a guiding wheel of a vehicle through two handles that are movable in rotation in a substantially vertical plane, each connected to one bar of a three bar set, a first bar of each of the three bar sets forming with each of the respective handles a lever hinged to the vehicle, a third bar of each set being integral with a connecting bar rotatable about its longitudinal axis, the longitudinal axis of the connecting bar being transverse to the longitudinal axis of the vehicle, the connecting bar being integral in rotation with a return arm which is pivotally connected to the steering rod wherein a second bar of one three bar set forms a first angle with the first bar and a second angle with the third bar, wherein one of the first and second angles is greater than 180° and wherein a second bar from a second three bar set forms a third angle with the first bar and a fourth angle with the third bar, wherein both the third and fourth angles are less than 180°.

2. An manual actuating device according to claim 1, wherein the vehicle is a motorcycle and each of the handles is respectively pivotally attached to the right side and the left side of an upper part of an engine-transmission block of the motorcycle in order to form, with each of the respective three bar sets, a lever-block and wherein the connecting bar connects the two lever-blocks above the engine-transmission block.

3. A manual actuating device according to claim 2, wherein the return arm is disposed on a side of the engine-transmission block and is connected at its lower part to the steering rod, so as to leave free a space to the front of the engine-transmission block in order to allow to house therein an auxiliary member such as a cooling radiator.

* * * * *